Figure 1:
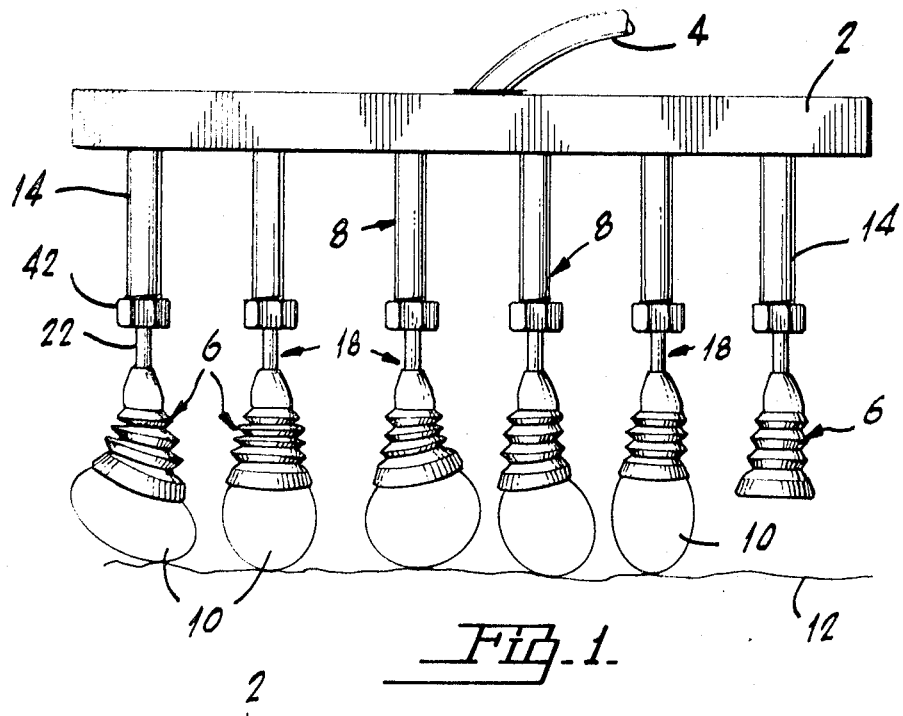

United States Patent

Kuhl et al.

[15] 3,637,249
[45] Jan. 25, 1972

[54] AUTOMATIC LOADER HEADS

[72] Inventors: Henry Y. Kuhl; Paul R. Kuhl, both of P.O. Box 26, Flemington, N.J. 08822

[22] Filed: June 29, 1970

[21] Appl. No.: 50,639

[52] U.S. Cl. ...................................................294/64
[51] Int. Cl. ..................................................B66c 1/02
[58] Field of Search ..........................................294/64, 65

[56] References Cited

UNITED STATES PATENTS

| | | | |
|---|---|---|---|
| 1,987,336 | 1/1935 | Powell | 294/65 X |
| 3,558,171 | 1/1971 | Netsch et al. | 294/64 |
| 3,062,578 | 11/1962 | Bushong | 294/65 |
| 3,330,589 | 7/1967 | Mumma | 294/64 |
| 3,077,993 | 2/1963 | Mulvany et al. | 214/1 |

Primary Examiner—Evon C. Blunk
Assistant Examiner—Johnny D. Cherry
Attorney—Sperry and Zoda

[57] ABSTRACT

A vacuum egg-lifting device is provided with a vacuum head carrying a plurality of holding members within which tubular stems are slidably movable within predetermined limits against the action of a spring while being accurately guided by the holding members. The stems have flexible egg-engaging cups at the lower ends thereof to which a vacuum and air pressure may be applied from the vacuum head for lifting and discharging eggs from the device.

5 Claims, 2 Drawing Figures

PATENTED JAN 25 1972

3,637,249

INVENTORS:
HENRY Y. KUHL
PAUL R. KUHL
BY Sperry and Zoda
Attorneys

AUTOMATIC LOADER HEADS

FIELD OF THE INVENTION

It is common practice in the commercial handling of eggs to use a vacuum egg-lifting device for transferring groups of eggs to or from crates, filler flats or cartons so as to place them on the rolls or conveyors of egg washers, candlers, or graders or in transferring the eggs to other filler flats, cartons or the like. For this purpose a vacuum head is generally provided by which a number of flexible egg engaging cups to which a vacuum or air pressure is applied to lift eggs engaged by the cups and to release the eggs from the vacuum head.

However, the egg-lifting devices heretofore employed have generally had the egg-engaging cups held in substantially fixed positions and in a common plane with the result that it is not always possible to bring all of the vacuum cups in effective engagement with adjacent eggs which are of different size or height or which are differently positioned on a support. Even when the egg-engaging cups are provided with bellows type or other highly flexible sidewalls, the cups are not always capable of moving into airtight or proper lifting contact with all of the eggs on a filler flat, carton or other support. Moreover, in moving the vacuum head with its egg-engaging cups toward and away from an assembly of eggs, whether this is done manually or by mechanical means, the device may be tilted in such a way that only imperfect or insufficient contact of the suction cups with the eggs may take place.

A further problem encountered in the handling of large numbers of eggs when using a vacuum head having a common chamber communicating with numerous vacuum cups, arises from the fact that the absence of one or several eggs from a group to be lifted serves to reduce or destroy the vacuum applied to other vacuum cups. The remaining eggs of the group then may not be lifted at all or may fall from the vacuum cups so as to be cracked or broken.

In an effort to overcome this difficulty some constructions provide a separate check valve for each vacuum cup assembly, which is very expensive, whereas others have used a powerful and excessively high vacuum which not only tends to rupture or crack the eggs but also serves to draw the fluid from broken eggs up into the head and vacuum system presenting a difficult cleaning problem.

PREFERRED EMBODIMENT OF THE INVENTION

In accordance with the present invention these objections inherent in prior egg-lifting devices are overcome and a construction provided which is capable of lifting and transferring large numbers of eggs effectively and rapidly, even though the eggs differ greatly in size or position and without danger of injury to the eggs or clogging of the equipment.

These results are preferably attained by providing a vacuum egg-lifting device with a plurality of assemblies each of which includes a holding member within which a tubular stem is slidably movable against the action of yieldable spring means. The stem is accurately guided in its movement with respect to the holding member and further is provided with an air passage therethrough having a restriction therein which limits the flow of air through the stem. In this way there is no major loss of vacuum in the absence of an egg from any vacuum cup and the flow of fluid from a broken egg into the vacuum head is effectively prevented.

THE DRAWINGS

Figure 2:
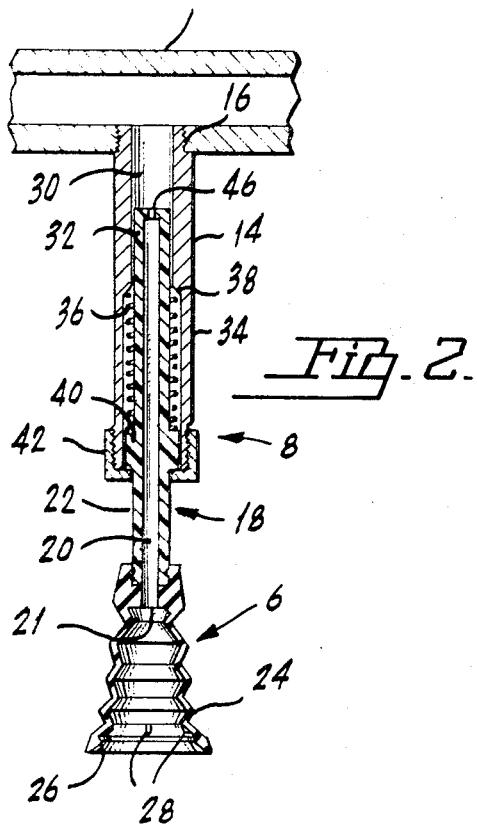

FIG. 1 is a side elevation of a typical vacuum head having a plurality of vacuum cup assemblies carried thereby in accordance with the present invention; and FIG. 2 is a vertical sectional view through one of the assemblies carried by the vacuum head of FIG. 1.

In that form of the invention chosen for purposes of illustration in the drawings the egg-lifting device comprises a vacuum head 2 which may be connected to a suitable source of vacuum and air pressure by a hose or connection 4. The vacuum head may be moved manually or by mechanical means into and out of position to bring the vacuum cups 6 of the individual assemblies 8 into effective contact with eggs 10. The eggs are usually presented in an orderly arrangement for handling by the egg-lifting device and the assemblies 8 are therefore arranged in a similar manner so as to project downwardly from the vacuum head 2 as shown in FIG. 1. However, as further shown in FIG. 1 the eggs may vary greatly in size and may be differently positioned or in some instances may be displaced from their usual arrangement depending upon the nature of the support 12 on which the eggs are located and the preceding operations by which the eggs have been handled. Thus, while the eggs may all be of substantially the same size and regularly arranged when they have been previously graded and placed in cartons or filler flats whereas they may differ greatly in size as they are received from a supplier for cleaning, candling, grading and packing and in some instances they may be randomly arranged on a tray or other support.

In accordance with the present invention it is possible to handle the eggs under any such conditions and for this purpose the assemblies 8 each include a cylindrical housing member 14 which is provided at its upper end with attaching means such as the threads 16 for securing the housing member fixedly in place on the vacuum head 2. A tubular stem 18 is slidably movable with respect to the housing member and has an air passage 20 extending therethrough. The lower end 22 of the stem 18 projects beyond the lower end of the housing member 14. The vacuum cup 6 is mounted on the lower end 22 of the stem 18 and has an air passage 21 therein communicating with the air passage 10 in the stem. The cup 6 preferably is formed of relatively soft rubber or plastic material and the sides of the cup have a bellows-type or corrugated formation as shown at 24, permitting the mouth 26 of the cup to be deflected readily into any position or shape necessary to establish effective contact with eggs of various shapes and located in various positions on a support 12. Furthermore, the inner surface of the cup adjacent the mouth 26 is provided with small projections 28 which hold the egg contacted by the vacuum cup in spaced relation to the inner surface of the cup. In this way the marginal edges of the cup are free to establish a sealing engagement with the surface of the egg whereas upon release of the vacuum the egg will be readily released and there will be no danger of the egg becoming stuck within the cup. The danger of an egg being raised or even partially lifted from a support or tray on which it is to be deposited and thereafter released, is eliminated. The possibility of cracking or misplacing of eggs is accordingly reduced.

The housing member 14 employed is designed to guide the stem 18 and cup 6 in their movement relative to the vacuum head 2 and to urge the stem and vacuum head toward a normal inactive and extended position as shown by the empty vacuum cup at the right hand side of FIG. 1. For this purpose the housing member 14 is formed with a passage therethrough having an upper guiding portion 30 which is slightly larger in diameter than the upper portion 32 of the stem 18 so as to guide the stem in its sliding movement with respect to the housing member and prevent undesired tilting or sticking of the stem with respect to the housing member. The lower end of the housing member is of substantially larger internal diameter than the upper guiding portion and serves as a spring enclosing portion 34 within which a spring 36 is located. The upper end of spring 36 bears against a downwardly facing shoulder 38 at the lower end of the guiding portion 30 of the housing member whereas the lower end of spring 36 bears against a projection or shoulder 40 on the stem 18. The lower end of the housing member 14 is provided with a closure cap 42 through which the lower end 22 of the stem 18 extends and against which the lower side of the projection 40 is engageable to limit the outward movement of the stem and vacuum cup 6 with respect to the housing member 14. The projection or shoulder 40 on the stem 18 is preferably generally cylindrical in shape and slightly smaller than the spring enclosing portion 34 of the housing member so that it will aid in preventing tilting or sticking of the stem as it moves longitudinally with respect to the housing member.

The construction thus provided serves to permit each individual vacuum cup 6 to make a gentle and yielding contact with the surface of an egg toward which it is moved. As shown FIG. 1 the upper surfaces of the eggs need not be positioned in the same plane whereby the size and position of the eggs may vary considerably without impairing the operation of the device. Furthermore, as shown in FIG. 2 the air passage 20 through the stem 18 may be provided with a relatively small opening as restriction 46 for the purpose of limiting the airflow through the air passage 20 to the vacuum head 2 so that the absence of one or more eggs from the assembly will not so reduce the vacuum applied to other vacuum cups sufficiently to render them ineffective or unable to raise the eggs contacted thereby. Furthermore, the restriction 46 serves to limit or prevent the flow of liquid from a broken egg through the stem and in the vacuum head whereby the problem of cleaning the head is practically eliminated.

In the event any vacuum cup 6 is applied to a broken egg the liquid from the egg which may be drawn upward therefrom will be substantially entirely confined to the cup and stem of the assembly. It is then only necessary to unscrew the closure cap 42 from the housing member 14 whereupon the stem 18 with its vacuum cup 6 can be removed and cleaned or in the alternative, the housing member carrying the stem and cup may be detached from the vacuum head and a replacement assembly be substituted. In this way the equipment may be quickly and easily maintained in a clean sanitary condition at all times without the delays and difficulties encountered upon the breakage of an egg when using equipment of the prior art.

This construction not only is adapted for use with either manually or mechanically operated devices but is also simple and economical to produce and renders it possible to maintain the equipment in a clean and operative condition at all times. The device further can be employed with systems wherein air pressure is applied to the vacuum head and assemblies to assure the proper and timely release of eggs from the vacuum cups when the eggs are to be deposited on some other tray or support. In actual practice it has been found that the damage to eggs and the occasions wherein one or more eggs are left on a tray or support and not properly lifted therefrom is substantially reduced and the egg handling capacity and speed of operation of equipment using the devices of the present invention can be substantially increased.

While the construction herein shown and described is of particular advantage in the handling of eggs, it will be apparent that it may be employed in handling golf balls, fruits, nuts and other rounded objects and therefore it should be understood that the invention is of general application and usage.

We claim:

1. A vacuum egg-lifting device comprising a vacuum head, a housing member provided at its upper end with means for securing the housing member to the vacuum head, said housing member having a passage therethrough presenting an upper guiding portion of a predetermined internal diameter and a lower spring enclosing portion of a greater internal diameter, there being a radially extending shoulder at the lower end of the guiding portion facing toward the spring enclosing portion of the holding member, a stem slidably movable within the housing member and having an air passage therethrough, said stem having an upper portion which is somewhat smaller in diameter than the guiding portion of the housing member and slidably received therein, said stem having a shoulder thereon slidably movable within the spring enclosing portion of the holding member, a spring compressed between the shoulder on the housing member and the shoulder on said stem for urging said stem outward with respect to the housing member, stop means on the lower end of the housing member for limiting outward movement of the stem under the action of said spring, said stem having a lower portion projecting beyond the lower end of the housing member and having a flexible egg-engaging cup thereon, said cup having an opening therein communicating with the air passage through the stem for the passage of air from the cup through said stem and housing member to the vacuum head for applying a vacuum or air pressure to an egg engaged by said cup.

2. A vacuum egg-lifting device as defined in claim 1 wherein the air passage through the stem is of substantially smaller diameter than the passage through the holding member.

3. A vacuum egg-lifting device as defined in claim 1 wherein the shoulder on said stem is only slightly smaller than the spring enclosing portion of the housing member preventing tilting or sticking of the stem so as to aid in guiding the stem upon longitudinal movement of the stem with respect to the housing member.

4. A vacuum egg-lifting device as defined in claim 1 wherein said flexible egg-engaging cup has circumferentially spaced inwardly extending projections on the inner surface thereof for limiting the area of contact between an egg and the inner surface of the cup.

5. A vacuum egg-lifting device as defined in claim 1 wherein said vacuum head is provided with a plurality of assemblies including housing members with their stems and egg-engaging cups, and the vacuum head has a common vacuum chamber therein communicating with all of said assemblies whereas the total diameter of the air passages through all of the stems of the assembly is insufficient to prevent the lifting of eggs by a portion only of said assemblies in the absence of eggs engaging the remaining assemblies of said device.

* * * * *